United States Patent [19]

Dimitri

[11] Patent Number: 4,957,557
[45] Date of Patent: Sep. 18, 1990

[54] SUBMICRON LIGNIN DISPERSIONS

[75] Inventor: Mitchell S. Dimitri, Charleston, S.C.

[73] Assignee: Westvaco Corporation, New York, N.Y.

[21] Appl. No.: 255,444

[22] Filed: Oct. 11, 1988

[51] Int. Cl.$^5$ .............................................. C08L 97/02
[52] U.S. Cl. ................................................. 106/123.1
[58] Field of Search ..................................... 106/123.1

[56] References Cited

U.S. PATENT DOCUMENTS

| | | | |
|---|---|---|---|
| 3,216,839 | 11/1965 | Webster | 106/123.1 |
| 4,097,377 | 1/1978 | Ayukawa | 210/724 |
| 4,891,070 | 1/1990 | Dilling et al. | 106/123.1 |
| 4,892,587 | 1/1990 | Dilling et al. | 106/123.1 |
| 4,892,588 | 1/1990 | Dilling et al. | 106/123.1 |

OTHER PUBLICATIONS

Hackh's Chemical Dict., pp. 214 & 213, 1944.

*Primary Examiner*—Mark L. Bell
*Assistant Examiner*—David M. Brunsman
*Attorney, Agent, or Firm*—Terry B. McDaniel; Richard L. Schmalz

[57] ABSTRACT

A lignin dispersion of submicron particles with film forming, binding, and adhesive properties in which the median particle diameter of the lignin in dispersion preferably is less than about 300 angstroms. The aqueous dispersion is formed by reacting about 12 to 18% lignin by weight in aqueous solution with from about 2 to 15 moles ammonia, 4 to 12 moles formaldehyde, and 0.25 to 1.25 moles sodium hydroxide or potassium hydroxide at a temperature of at least about 150° F. for a period of time to produce a colloidal dispersion of lignin particles.

3 Claims, No Drawings

SUBMICRON LIGNIN DISPERSIONS

This invention relates to small particle size lignin materials and to a method of producing lignin products having a submicron median particle diameter in colloidal dispersion, which products can form a film and are suitable for use as chemical additives in other chemical processes and compositions. The submicron lignin dispersion is characterized by having monodispersed particles, necessary for its film forming properties.

BACKGROUND OF THE INVENTION

Lignin is a complex, high-molecular weight polymer occurring naturally in close association with cellulose in plants and trees. In the paper-making industry, lignin may be recovered as a by-product of the cellulose product by two principal wood-pulping processes known as the sulfite process and the kraft process. In the sulfite pulping process, lignin is solubilized from the cellulosic portion of the wood pulp by direct sulfonation, while the kraft process is based on an alkaline degradation mechanism causing cleavage of $\beta$-aryl ether linkages in the polymeric lignin which subsequently result in chemical functions of the phenolic and carboxylic type. Kraft process lignin generally is isolated by acid precipitation from the black liquor of a kraft pulping process at a pH below the pKa of the phenolic groups.

Depending on conditions under which the lignin is precipitated, the precipitated lignin may be either in the form of free acid lignin or a lignin salt. If lignin is precipitated at a high pH, such as about 9.5 to 10, the lignin is obtained in the form of a salt. If this lignin is further processed by washing, acidifying to a low pH, such as about 2 to 5, and further washed so as to be substantially free of salt and ash-forming ingredients, free acid lignin, known as "A" lignin, is obtained. A monovalent salt of lignin, such as an alkali metal salt or an ammonium salt, is soluble in water, whereas free acid lignin and polyvalent metal salts of lignin are insoluble in water.

The high degree of chemical activity which is characteristic of lignin permits the preparation of many organic derivatives. Lignin by-products have been variously employed in other chemical compositions as surfactants, extenders, dispersants, reinforcers, absorbents, binders, sequestering agents, emulsifiers and emulsion stabilizers, and as a stabilizing and protective colloid. Lignosulfonate compounds, particularly sodium salts of lignosulfonates, have been employed as additives and dispersants in textile dyestuffs and printing pigments. Sodium salt sulfonated lignin by-products have been sold for many years under the trademark Indulin ® by Westvaco Corporation of North Charleston, S.C.

Certain lignins have been utilized as a binding agent for water-based ink systems incorporating pigments and/or dispersed dyes. U.S. Pat. No. 2,525,433 discloses the use of lignin dissolved in a water-missible solvent as a binding material for a pigment in printing ink. The method of U.S. Pat. No. 2,525,433 requires the use of a solubilizing agent, generally an organic amine or alcohol, to completely dissolve the lignin particles. The resultant solution when used with pigments for ink application is limited to newsprint or other porous paper. There is no film-forming action of the lignin and no solid particles remain after the lignin is solubilized. Adhesion to coated paper, calendered paper and sized papers is poor with excessive rub-off resulting.

Lignin is recovered from the black liquor of a kraft pulping processe by decreasing the liquor pH by acidification with carbon dioxide, organic or inorganic acids or bivalent metal salts. When the liquor pH is reduced from its normal pH of 13.0–13.5, the lignin precipitates as the sodium salt in the form of agglomerates of around 70 microns median diameter (700,000 angstroms (A)) or larger. The lignin-black liquor slurry is filtered to remove the liquor and the lignin particles are recovered as a filter cake. This cake is washed to remove the occluded black liquor and the purified lignin solids are acidified to pH 2.5 and further washed. The lignin in this form is known as "A" lignin and contains 2–3% inorganic salts through additional washing can lower the inorganics to 0.5% or less. This lignin can be reacted with various organic or inorganic agents to produce products useful in dyestuff dispersants, asphalt emulsifiers, concrete air entrainers, and other useful compounds.

The "A" lignin aggregates which are recovered from the kraft pulping process consist of a popcorn-like, porous structure in which the individual ultimate particles are fused at their points of surface contact to adjacent particles. The bonds between these individual particles are extremely strong, and attempts in the past to break up these aggregates by grinding into smaller particles have not been successful in obtaining submicron particles, i.e., particles having a median diameter of less than one micron (10,000 A). Wet grinding of lignin produces only a particle size as low as about 30 to 40 thousand angstroms diameter.

Early U.S. Pat. No. 3,223,697 discloses a method of producing lignin as a kraft wood-pulping by-product in small particle size by mechanically continuously propelling a stream of an aqueous solution of an alkaline lignin through a mixing zone of constricted cross-sectional area with sufficient velocity to create turbulent flow while continuously introducing a stream of a precipitant for the lignin to mix substantially instantaneously with the lignin solution to precipitate the lignin particles in the mixing zone in small particle sizes. However, such a method requires considerable processing equipment and careful control of temperatures and pressures at considerable economic expense, and the random shapes and sizes of the lignin particles produced by the method do not allow close packing or particle-particle juxtaposition necessary for proper film-forming and binding applications.

In the use of lignin by-products in the formulation of certain products and chemical compositions, it is desirable that the lignin particles be small enough that the particles may form continuous films, particularly in use of the lignin as a binder or coating in printing, in laminating paper, in forming rigid boards, as an adhesive for binding sawdust, woodchips, or plywood, and as a green strength enhancer for ceramic bodies or stain for wood surfaces.

BRIEF OBJECTS OF THE INVENTION

It is therefore an object of the present invention to provide a lignin product of submicron median particle diameter and of a shape and size as to be effectively formed into a film and employed in other chemical applications and processes.

It is another object of the present invention to provide an improved method of producing a lignin product of sufficiently small median particle diameter as to form films and be particularly suitable for film-forming and use as chemical additives in other chemical processes and products, such as adhesives, binders in printing inks, surface coating for paper, and the like.

SUMMARY OF THE INVENTION

The present invention is directed to production of lignin materials which, in liquid dispersion form, comprise particles having a median particle diameter of less than about one micron, or 10,000 angstroms, preferably less than about 300 angstroms, and of such uniform shape and size so as to be readily employed as film-formers and additives in other products and chemical compositions. The lignin material product comprises colloidal dispersion of monodispersed lignin particles which coalesce and dry to form a continuous film which is particularly useful as a binder in pigment printing, coating, and composite board manufacture.

The method of the present invention comprises the steps of preparing an aqueous solution containing from about 12 to 18% lignin by weight, from about 2 to 15 moles ammonia, from about 4 to 12 moles of sodium hydroxide or potassium hydroxide, per mole of lignin present in the solution. The solution is heated to at least about 150° F. for a sufficient time to cross link the lignin and form a colloidal suspension of lignin particles of submicron median particle diameter, preferably, less than about 300 angstroms median particle diameter. Solids concentration of the colloidal dispersion may be from between about 15-20% by weight dry at pH 8.0-10.0. Preferably, the aqueous solution may contain about 5 moles ammonia, 6 moles formaldehyde, and 0.75 moles sodium hydroxide per mole of lignin.

As the reaction proceeds, the lignin becomes insoluble and precipitates as small monodispersed particles. No agglomeration of these particles into flocs is noted and these precipated particles maintain the original particle size until the reaction is complete.

The preferred method of production is illustrated by the following example.

EXAMPLE

1. A 750 gallon reactor is charged with 2667 lbs. slurry of "A" lignin (0.8 mole) at 30.0% solids dry weight.
2. The "A" lignin slurry is diluted to a 17.2% solids lignin concentration with 1995 lbs. of water and agitated 60 minutes.
3. 48 lbs. of 50% solids sodium hydroxide (0.6 mole) is added to catalyze the reaction.
4. Ammonium hydroxide containing 67.9 lbs. of ammonia (4.0 moles) is added as agitation is continued for 2 hours.
5. A formaldehyde solution containing 144 lbs. (4.8 moles) of active formaldehyde is added and agitation continued.
6. The reactants are heated to 185° F. and this temperature is maintained for 4 hours.
7. The reactants are cooled to 125° F.
8. The final product is a colloidal lignin dispersion of 17.5% dry solids with a median particle diameter of 265 angstroms and a viscosity of 7.0 cps Brookfield at 25° C. pH is 8.66.

To determine median particle diameter size of the lignin products produced in accordance with the present invention, a colloidal lignin dispersion, as in Example 1, containing 15 to 20% dry solids by weight is diluted with distilled deionized water to a concentration of 300-400 parts per million. The diluted sample is placed on an electron microscope grid and frozen instantly with liquid nitrogen. The frozen grid is placed in a cold holder and viewed on a Philips 400 electron microscope. Photographs are taken at 130,000 magnification.

Utilizing the photographs, the particles are counted and the longest diameter measured on a Zeiss Mop-3 image analyzer. Particle size distribution and median particle diameter is then calculated using this data. The term "median" in reference to particle size is used to identify that particle diameter so chosen in the series that is counted and measured that half the number of individual particles, by diameter size, are above it and other half, by diameter size, are below it.

The products of the present invention can form tightly adhering films on a number of different substrates. When cast on glass, a clear, tan tinted film forms which does not craze or turn translucent on drying. A similar result is obtained with an aluminum foil substrate which has been cleaned to remove the processing oils. Cleaned polyethylene can also be coated, through the adhesion is not as strong as that obtained on glass. Films are also produced on glossy paper, coated paper, calendered paper, and newsprint.

This film-forming property of the lignin materials of the present invention is of great utility in formulating pigmented and dye-colored inks. In carbon black base ink formulations, a glossy surface is produced on calendered paper and newsprint. Of particular value is the good rub resistance and negligible wash off when this product is the ink vehicle. At high carbon black loadings, e.g., above 15%, dry weight viscosity is excellent and stable.

The following examples indicate the utility of this product in ink formulations.

EXAMPLE 2

Three samples of a carbon black composition are prepared, as follows:
1. Water and an Acrysol I-62 pigment dispersant (Rohm & Haas) are mixed at low speed in a 1200 ml Waring blender.
2. pH is adjusted from 3.5 to 8.5 with ammonium hydroxide.
3. Carbon black and the submicron lignin dispersion of Example 1 is added at moderate speed.
4. After addition the blender speed is increased and agitation continued for 15 minutes.
5. The formulation is then shot milled for 30 minutes. The results were as follows:

| Sample No. | 1 | 2 | 3 |
|---|---|---|---|
| Ingredients | | | |
| 1. CSX 220 Carbon Black (Cabot Corp.) | 20% | 25% | 25% |
| 2. Lignin-Example 1 | 5% | 6% | 7% |
| 3. Acrysol I-62 (2) | 1% | 1% | 2% |
| 4. Water | 74% | 68% | 66% |
| | 100% | 100% | 100% |
| Results | | | |
| pH | 8.85 | 8.8 | 9.3 |
| Viscosity Shell Cup--Secs. | S3-19 | S3-21.0 | S4-21.5 |
| Viscosity CPS | 12 | 28 | 73 |
| Med. Particle Dia. (Carbon Black & Lignin) | 0.2 micron | 0.24 micron | 0.24 micron |

Drawdowns of these formulations on calendered paper produced deep glossy black films. Rub-off was low and wash off was negligible.

These formulations are typical for ink base recipes with high carbon black loadings and are well suited for water-based flexo graphic ink applications.

EXAMPLE 3

A lignin dispersion of Example 1 was formulated into an ink for testing on a 55 inch flexo press. The following procedure was used for preparation.
1. A lignin dispersion of 16.2% solids was diluted to 5% by the addition of 43 lbs of water. This gave 12.5 lbs of dry solids in 68 lbs total.
2. CSX 220 Carbon Black (Cabot Corp.) (12.0 lbs) was mixed with the lignin slurry to give a 15% loading.
3. This intermediate mix was then ground for 1 hour in a pilot scale shot mill.
4. The ground ink contained median particle diameter of 0.29 microns; total dry solids of 19.4% and pH 9.20. Shell cup viscosity #3 was 32.6 seconds or 46.3 cps.

This ink was tested on a 55 inch flexo-graphic printing press. The material was fed to the printing press reservoir and pumped onto the printing rolls. The paper printed was 30 pound Bears Head, North Carolina stock. Initial press speed was 500 feet/minute and incrementally increased to 1100 feet/minute. A good copy was run at this speed. The paper was cut and folded. The test was considered to be successful and the ink performed well. Rub resistance was considered excellent.

Lignin dispersions, the object of this invention, have been found to be effective in oil base offset printing. The following example illustrates a formulation and the procedure used to prepare this ink.

EXAMPLE 4

Procedure:
1. A lignin dispersion of Example 1 is mixed with Vulkan K carbon black (Cabot Corp.) and REAX 88B sodium lignosulfonate (Westvaco) in a Waring blender for 5 minutes at maximum speed.
2. Bunker C fuel oil and linseed oil are added and agitation continued for 5 minutes.
3. Magie Oil 55 (ink oil—Magie Corp.) is added and the agitation continued for an additional 5 minutes.
4. The ink is then milled in a shot mill for one hour.

Formulation:

| | | |
|---|---|---|
| 1. Bunker C - | 32.6% | - Residual fuel oil |
| 2. Magie Oil 55 - | 28.8% | - Ink oil - Magie Co. |
| 3. Linseed Oil - | 2.6% | - Drying oil |
| 4. Vulkan K - | 10.4% | - Carbon black - Cabot Corp. |
| 5. Lignin - | 3.5% | - Lignin dispersion |
| 6. REAX 88B - Corp. | 0.8% | - Sodium lignosulfonate - Westvaco |
| 7. Water - | 21.3% | |
| | 100.0% | |

The final ink was stringy, water compatible and passed the grind gauge test with no particles above 2.5 microns. Drawdowns on calendered paper gave a lustrous deposit with good color development. Rub was low and water wash negligible.

In order to get inks with deeper black shades ink manufacturers have gone to higher carbon black loadings. This approach gives inks of higher than normal viscosity with rheological flow problems on high speed presses. In addition, it is felt that high carbon black loadings increase "fill in" in printing. This gives fuzzy reproduction and affects contrast. Considerable interest exists in flexographic printing for systems which give deep black shades without high carbon black loadings. One approach is to replace part of the black particles with black dye and still retain the desired shade. This has been difficult to achieve because the dye must be insolubilized and adhere to the ink vehicle.

The product of this invention has been found to effectively fix the dye and lower the carbon black loading in the final ink. This is shown in the following example and data.

EXAMPLE 5

Procedure:
1. A lignin dispension of Example 1 is placed in a 1200 cc Waring blender and diluted with water.
2. After mixing the slurry is heated to 165°–175° F.
3. A black disperse dye is added at high speed agitation for 3–5 minutes.
4. Carbon black is added and the contents mixed for 5–10 minutes at high speed.

Results:

| | Lignin Dispersion, Carbon Black and Sodyeco Black 4GCF | | | | |
|---|---|---|---|---|---|
| Run No. | Lignin Disersion % (wgt) A | Vulkan K % (wgt) B | Black 4GCF % (wgt) C | Water % (wgt) D | Sequence of Addition |
| 1 | 5.7 | 4 | 3.2 | 87.1 | A+D+C+B |
| 2 | 5 | 5 | 3 | 86.6 | A+D+C+B |
| 3 | 6 | 5 | 4 | 85 | A+D+C+B |
| 4 | 5 | 5 | 4 | 86 | A+D+C+B |
| 5 | 6 | 6 | 3 | 85 | A+D+C+B |
| 6 | 6 | 5 | 4 | 84.4 | A+D+C+B |
| 7 | 6 | 6 | 3 | 85 | A+D+C+B |
| 8 | 5 | 5 | 4 | 86 | A+D+C+B |
| 9 | 6 | 6 | 4 | 84 | A+D+C+B |
| 10 | 6 | 6 | 4 | 84 | A+D+C+B |
| 11 | 6 | 5 | 4 | 85 | A+D+C+B |
| 12 | 6 | 5 | 4 | 85 | A+D+C+B |
| 13 | 10 | 6 | 4 | 80 | A+D+C+B |
| 14 | 5 | 15 | — | 80.0 | A+D+B |

1. Lignin Dispersion - Westvaco Corp.
2. Vulkan K - Black ink pigment - Cabot Corp.
3. Black 4GCF - Soluble, prereduced blackdye - Sandoz
4. Tamol SN - Dispersant - Rohm & Haas
5. Hydrogen Peroxide - Reagent - Baker Chemical
6. Potassium Hydroxide - Reagent - Baker Chemical These formulations were deposited by making drawdowns on calendered paper and newsprint. After drying, they were tested for water wash and rub. Almost without exception, water wash was minimal and rub was negligible. The absence of water wash indicates the fixing of the water soluble dye in an insoluble coating on the lignin particles.

EXAMPLE 6

Lignin dispersions, the subject of this invention, have been found to function as an excellent suspending agent and binder for coating clays. The coatings adhere strongly to kraft paper and form a smooth film which seals the surface of the paper. These coatings also accept water and solvent base inks for printing.

The application of lignin dispersion-clay coatings was tested on kraft paper by handroll proofing and rod coating draw downs. Once dried, the coated paper was tested on a Teledyne Gurley Porisimeter, Model 4110. The results are shown below.

| Run | Paper Used | Formulation | Uncoated Control Secs | Coated Control Secs |
|---|---|---|---|---|
| 1 | 83lb S3 | Hydroprint 45% | 45.5 | 166.2 |
| 2 | | Lignin Dispersion 5% | 45.5 | 173.3 |
| 3 | 83lb S4 | Hydroprint 36% Lignin Dispersion 5% TiO$_2$ 9% | 38.8 | 119.1 |
| *4 | 83lb S3 Mod | Hydroprint 36% Lignin Dispersion 5% TiO$_2$ 9% | 38.8 | 252.3 |

*Run 4 - Rod coated instead of hand proofed

These coatings exhibited no rub-off or chalking and no water wash. When these coated papers were pressed at 290° F., 500 psig for 5 minutes, the films became glossy and tougher. These properties indicate the value of these formulations for improving appearance and printability of kraft paper for box applications.

Another use for lignin dispersion where it improves water resistance is in laminating kraft liner board or saturating grade kraft paper.

EXAMPLE 7

Two pieces of Westvaco 43 lb. liner board are laminated by sandwiching a lignin dispersion of Example 1 on the inner surfaces. The dispersion solids comprise 2.5% by weight of the two sheets. The sheets are laminated by pressing at 500 psig and 295° F. for a period of 4 minutes. A tight, unpeelable bond is developed. The laminate is boiled in distilled water for 2 hours without any evidence of separation.

EXAMPLE 8

The lignin dispersions are effective as wood adhesives creating a strong water resistant bond. They may also function as extenders for other adhesives in this application. The following example illustrates the use with wood.

Two pieces of outdoor plywood 3"×5"×½" are coated on the inside with a lignin dispersion of Example 1. The coated sides are placed together and the block placed in a heated press. The piece is kept at 300° F. and 150 psig pressure for 10 minutes, then removed and cooled. The test piece is immersed in boiling water for one hour, and shows no separation. Another test piece kept in water for 7 days also did not separate.

That which is claimed is:

1. A carbon black composition comprised of over 15% carbon black, on a dry weight basis, a dispersant, water, and a colloidal lignin dispersion wherein the lignin is "A" lignin derived from the kraft pulping process and the dispersion is characterized by monodispersed lignin particles exhibiting a median lignin particle diameter size of less than about 300 angstroms.

2. The carbon black composition of claim 1 wherein the carbon black loading is 25%.

3. The carbon black composition of claim 1 further comprising black disperse dye.

* * * * *

UNITED STATES PATENT AND TRADEMARK OFFICE
CERTIFICATE OF CORRECTION

PATENT NO. : 4,957,557

DATED : September 18, 1990

INVENTOR(S) : Mitchell S. Dimitri

It is certified that error appears in the above-identified patent and that said Letters Patent is hereby corrected as shown below:

In column 2, line 2, delete "processe" and substitute therefor --process--.

In column 4, line 13, before other, insert --the--.

In column 4, line 21, delete "through" and substitute therefor --though--.

In column 6, line 29, delete "Disersion" and substitute therefor --Dispersion--.

In column 7, lines 25 and 26, delete "laminatied" and substitute therefor --laminated--.

Signed and Sealed this

Sixteenth Day of November, 1993

Attest:

BRUCE LEHMAN

Attesting Officer

Commissioner of Patents and Trademarks